US012403427B2

United States Patent
Yoshizaki et al.

(10) Patent No.: US 12,403,427 B2
(45) Date of Patent: Sep. 2, 2025

(54) METHOD OF SEPARATING AND RECOVERING COBALT SALT AND NICKEL SALT

(71) Applicant: Toray Industries, Inc., Tokyo (JP)

(72) Inventors: Tomoya Yoshizaki, Otsu (JP); Takanori Soya, Otsu (JP); Masakazu Koiwa, Otsu (JP); Shigehisa Hanada, Otsu (JP)

(73) Assignee: Toray Industries, Inc., Tokyo (JP)

( * ) Notice: Subject to any disclaimer, the term of this patent is extended or adjusted under 35 U.S.C. 154(b) by 499 days.

(21) Appl. No.: 17/928,262

(22) PCT Filed: May 28, 2021

(86) PCT No.: PCT/JP2021/020477
§ 371 (c)(1),
(2) Date: Nov. 28, 2022

(87) PCT Pub. No.: WO2021/241742
PCT Pub. Date: Dec. 2, 2021

(65) Prior Publication Data
US 2023/0219040 A1 Jul. 13, 2023

(30) Foreign Application Priority Data

May 29, 2020 (JP) ................................ 2020-094338

(51) Int. Cl.
| | | |
|---|---|---|
| *B01D 61/02* | (2006.01) | |
| *B01D 61/04* | (2006.01) | |
| *B01D 69/02* | (2006.01) | |
| *B01D 69/10* | (2006.01) | |
| *B01D 69/12* | (2006.01) | |
| *B01D 71/56* | (2006.01) | |
| *C01G 51/10* | (2006.01) | |
| *C01G 53/10* | (2006.01) | |
| *C02F 1/44* | (2023.01) | |
| *C02F 1/66* | (2023.01) | |
| *C02F 9/00* | (2023.01) | |
| *C02F 101/20* | (2006.01) | |
| *C22B 3/00* | (2006.01) | |
| *C22B 3/06* | (2006.01) | |
| *C22B 3/22* | (2006.01) | |

(52) U.S. Cl.
CPC ....... *B01D 61/0271* (2022.08); *B01D 61/025* (2013.01); *B01D 61/029* (2022.08); *B01D 61/04* (2013.01); *B01D 69/02* (2013.01); *B01D 69/10* (2013.01); *B01D 69/12* (2013.01); *B01D 71/56* (2013.01); *C01G 51/10* (2013.01); *C01G 53/10* (2013.01); *C02F 9/00* (2013.01); *C22B 3/06* (2013.01); *C22B 3/22* (2013.01); *C22B 23/0407* (2013.01); *C22B 23/0453* (2013.01); *B01D 2311/04* (2013.01); *B01D 2311/06* (2013.01); *B01D 2317/025* (2013.01); *C02F 1/441* (2013.01); *C02F 1/442* (2013.01); *C02F 1/66* (2013.01); *C02F 2101/20* (2013.01); *C02F 2301/08* (2013.01)

(58) Field of Classification Search
CPC ......................... B01D 61/0271; B01D 61/025; B01D 61/029; B01D 61/04; B01D 69/02; B01D 69/12
See application file for complete search history.

(56) References Cited

U.S. PATENT DOCUMENTS

| | | | |
|---|---|---|---|
| 6,843,917 B1 | 1/2005 | Guy et al. | |
| 10,308,523 B1 * | 6/2019 | Chow | ........... C01D 15/08 |
| 11,905,180 B2 * | 2/2024 | Yoshizaki | ............. C22B 3/44 |
| 2010/0150802 A1 | 6/2010 | Gilliam et al. | |
| 2017/0136422 A1 * | 5/2017 | Ogawa | .............. B01D 69/00 |
| 2018/0155208 A1 | 6/2018 | Chow et al. | |

FOREIGN PATENT DOCUMENTS

| | | |
|---|---|---|
| EP | 4 141 135 A1 | 3/2023 |
| JP | 62-201606 A | 9/1987 |
| JP | 4-11928 B2 | 3/1992 |
| JP | 11-226366 A | 8/1999 |
| JP | 2003-500542 A | 1/2003 |
| JP | 2019-173063 A | 10/2019 |
| JP | 2020513397 A | 5/2020 |

(Continued)

OTHER PUBLICATIONS

Dupont Product Data Sheet FilmTec NF270 Element. No date. Retrieved from internet 2025.*
Dupont Product Data Sheet FilmTec NF270-400/34i Element. No date. Retrieved from internet 2025.*
Office Action dated Mar. 22, 2024, of counterpart Canadian Patent Application No. 3,185,166.
International Preliminary Report on Patentability dated Nov. 17, 2022, of corresponding International Application No. PCT/JP2021/020477 along with an English translation of Written Opinion of the International Searching Authority dated Aug. 10, 2021.
Extended European Search Report dated May 21, 2024, of counterpart European Patent Application No. 21812490.7.

(Continued)

*Primary Examiner* — Christina A Johnson
(74) *Attorney, Agent, or Firm* — DLA Piper LLP (US)

(57) ABSTRACT

A method of separating and recovering a cobalt salt and a nickel salt includes a separation step of separating, by using a nanofiltration membrane, a cobalt salt and a nickel salt from a rare metal-containing aqueous solution containing at least both the cobalt salt and the nickel salt as rare metals, in which the nanofiltration membrane has a glucose permeability of 3 times or more a sucrose permeability, the sucrose permeability of 10% or less, and an isopropyl alcohol permeability of 50% or more when a 1,000 mg/L glucose aqueous solution, a 1,000 mg/L sucrose aqueous solution, and a 1,000 mg/L isopropyl alcohol aqueous solution, each having a pH of 6.5 and a temperature of 25° C., individually permeate through the nanofiltration membrane at an operating pressure of 0.5 MPa.

15 Claims, No Drawings

(56) References Cited

FOREIGN PATENT DOCUMENTS

| KR | 20060086209 A | 7/2006 |
|----|---------------|--------|
| WO | 2013/026093 A1 | 2/2013 |
| WO | 2014094003 A2 | 6/2014 |
| WO | 2019/018333 A1 | 1/2019 |

OTHER PUBLICATIONS

"FilmTec™ Membranes, FilmTec™ NF270 Nanofiltration Elements for Commercial Systems," Dupont, XP093159661, Aug. 1, 2021, Product Worksheet retrieved from the internet on May 6, 2024: http://www.dupont.com/products/filmtecnf2704040.html.
International Search Report dated Aug. 10, 2021, of corresponding International Application No. PCT/JP2021/020477 along with an English translation.
Lin, Su-Hsia et al., "Metal Rejection by Nanofiltration from Diluted Solutions in the Presence of Complexing Agents," *Separation Science and Technology*, 2004, vol. 39, No. 2, pp. 363-376.
Belkhouche, Nasr-Eddine et al., "Separation of cobalt and nickel by nanofiltration using a FilmTec membrane," *Euro-Mediterranean Journal for Environmental Integration*, 2018, vol. 3, No. 12, pp. 1-11.
Nguyen, Nguyen Cong et al., "Separation of three divalent cations ($Cu^{2+}$, $Co^{2+}$ and $Ni^{2+}$) by NF membranes from pHs 3 to 5," *Desalination*, 2013, vol. 328, pp. 51-57.
"Exploration Project for Promoting the Development of Mineral Resources in FY2017: Report on a study on mineral resource infrastructure development (basic study for the formulation of a strategy to secure mineral resources)," Mitsubishi Research Institute, Inc., Environment and Energy Division, Mar. 2018, along with a partial English translation.
Office Action dated Feb. 12, 2025, from counterpart Japanese Application No. 2021-531280.
Office Action dated Jun. 16, 2025, from counterpart Korean Patent Application No. 10-2022-7041416.
Yali Zhao et al., "Preparation of a highly permeable nanofiltration membrane using a novel acyl chloride monomer with -PO(CI)2 group," Desalination 431, 2018, pp. 56-65.

\* cited by examiner

METHOD OF SEPARATING AND RECOVERING COBALT SALT AND NICKEL SALT

TECHNICAL FIELD

This disclosure relates to a method of separating and recovering a cobalt salt and a nickel salt from an aqueous solution containing cobalt and nickel, and particularly to a method of efficiently separating and recovering a cobalt salt and a nickel salt using a nanofiltration membrane.

BACKGROUND

In recent years, with the economic development in the world, the demand for mineral resources has been greatly increased. However, of the mineral resources indispensable for a wide range of industries, including the semiconductor industry, some resources are economically unprofitable due to high mining and refining costs even if they have large reserves in the earth's crust, or some resources are localized in specific areas, and mining thereof has been postponed until now. On the other hand, environmental problems are also getting a lot of attention, and construction of a recycling-oriented society is desired. In particular, in terms of reducing carbon dioxide emissions, the development of electric vehicles and motors and batteries used therein is accelerating. In particular, regarding batteries, a lithium ion battery is expected to be the main batteries of electric vehicles because of energy density and lightness thereof.

Cobalt is widely used in various industries as an alloy element of special steel or a magnetic material. For example, the special steel is used in the fields of aerospace, power generators, and special tools, taking advantage of excellent wear resistance and heat resistance peculiar to cobalt. As the magnetic material, ferromagnetic alloy materials containing cobalt are used for small headphones, small motors and the like. Cobalt is also used as a raw material for a positive electrode material in lithium ion batteries. In recent years, the demand for a cobalt-containing positive electrode material has been steadily increasing with the spread of the lithium ion battery for automobiles and power storage, as well as for mobile information processing terminals such as small personal computers and smartphones.

Nickel is used as stainless steel by taking advantage of high gloss and corrosion resistance. In recent years, similar to cobalt, the demand for nickel as a material for a lithium ion battery is increasing.

Thus, as the demand for various rare metals increases, efforts to recover rare metals such as lithium, cobalt, and nickel from a lithium ion battery that has been used and a waste material generated from a production process thereof have been promoted from the viewpoint of recycling valuable resources (WO 2019/018333 and Report of exploration project for promotion of mineral resource development in 2017, research project of mineral resource industrial infrastructure (basic survey on mineral resource securing strategy development), Mitsubishi Research Institute, Inc., Environment and Energy Business Headquarters, March 2018).

In addition, as a method of recovering nickel and cobalt from an aqueous solution, there is proposed a method of eluting and recovering high-concentration nickel and cobalt, in which an aqueous solution containing nickel, cobalt, and other impurities is mixed with an ion exchange resin, nickel and cobalt are adsorbed on the ion exchange resin, and then sulfuric acid is brought into contact with the ion exchange resin obtained by solid-liquid separation (JP 2019-173063 A).

The recovery of resources from waste lithium ion batteries is being put into practical use, centering on rare metals such as cobalt and nickel. Since a solvent extraction method is the mainstream of the methods in the related art, the use of a large amount of an organic solvent has a large environmental impact, and stationary separation is necessary. Therefore, the scale of the entire facility is increased, which is disadvantageous in terms of cost.

In addition, in the method of recovering nickel and cobalt from an aqueous solution using an ion exchange resin, since the selective separability for nickel and cobalt is low and the obtained eluent contains both cobalt and nickel at high concentrations, it is necessary to perform a separation operation by solvent extraction to separate cobalt and nickel.

It could therefore be helpful to provide a method of recovering a cobalt salt and a nickel salt with high efficiency by selectively separating cobalt and nickel from an aqueous solution containing cobalt and nickel by using a nanofiltration membrane without requiring a large amount of an organic solvent.

SUMMARY

We thus provide:

[1] A method of separating and recovering a cobalt salt and a nickel salt, the method including a separation step of separating, by using a nanofiltration membrane, a cobalt salt and a nickel salt from a rare metal-containing aqueous solution containing at least both the cobalt salt and the nickel salt as rare metals, in which the nanofiltration membrane has a glucose permeability of 3 times or more a sucrose permeability, the sucrose permeability of 10% or less, and an isopropyl alcohol permeability of 50% or more when a 1,000 mg/L glucose aqueous solution, a 1,000 mg/L sucrose aqueous solution, and a 1,000 mg/L isopropyl alcohol aqueous solution, each having a pH of 6.5 and a temperature of 25° C., individually permeate through the nanofiltration membrane at an operating pressure of 0.5 MPa.

[2] The method of separating and recovering a cobalt salt and a nickel salt according to [1], in which the nanofiltration membrane includes a base material, a support membrane on the base material, and a separation function layer on the support membrane, and the separation function layer includes a polyamide having a structure derived from a polyfunctional aliphatic amine and a structure derived from a polyfunctional acid halide.

[3] The method of separating and recovering a cobalt salt and a nickel salt according to [1] or [2], further including a complex forming step of adding a complex forming agent to the rare metal-containing aqueous solution before the separation step, in which the complex forming agent has a solubility in water of 100 mg/L or more.

[4] The method of separating and recovering a cobalt salt and a nickel salt according to [3], in which the complex forming step includes a step of adjusting a pH of the rare metal-containing aqueous solution to 1 or more and 9 or less.

[5] The method of separating and recovering a cobalt salt and a nickel salt according to [3] or [4], in which the complex forming step includes a step of adding an amine-based ligand as the complex forming agent.

[6] The method of separating and recovering a cobalt salt and a nickel salt according to any one of [1] to [5], further including, before the separation step, an acid treatment step of bringing a material containing at least both cobalt and nickel as rare metals into contact with an acid aqueous solution to obtain the rare metal-containing aqueous solution.

[7] The method of separating and recovering a cobalt salt and a nickel salt according to any one of [1] to [6], in which the separation step includes at least a first separation step and a 2a-th separation step which use the nanofiltration membrane, and
a permeated water obtained in the first separation step is treated in the 2a-th separation step.

[8] The method of separating and recovering a cobalt salt and a nickel salt according to any one of [1] to [6], in which the separation step includes at least a first separation step and a 2b-th separation step which use the nanofiltration membrane, and
a non-permeated water obtained in the first separation step is treated in the 2b-th separation step.

[9] The method of separating and recovering a cobalt salt and a nickel salt according to [8], in which the non-permeated water obtained in the first separation step is diluted to be treated in the 2b-th separation step.

[10] The method of separating and recovering a cobalt salt and a nickel salt according to [7], in which the permeated water obtained in the first separation step is diluted to be treated in the 2a-th separation step.

[11] The method of separating and recovering a cobalt salt and a nickel salt according to any one of [1] to [10], further including, before the separation step, a pre-separation step of separating an alkali metal salt and a polyvalent rare metal salt by using the nanofiltration membrane, to obtain a permeated water in which an alkali metal ion concentration (mg/L) is 100 times or more a polyvalent rare metal ion concentration (mg/L).

[12] The method of separating and recovering a cobalt salt and a nickel salt according to any one of [1] to [11], further including a concentration step of concentrating an aqueous solution obtained in the separation step with a reverse osmosis membrane.

[13] The method of separating and recovering a cobalt salt and a nickel salt according to [6], further including a mixing step of mixing a permeated water generated in a concentration step with the rare metal-containing aqueous solution obtained in the acid treatment step,
in which in the separation step, the permeated water and a concentrated water are obtained from a mixed water obtained in the mixing step.

[14] The method of separating and recovering a cobalt salt and a nickel salt according to [2], in which the polyfunctional aliphatic amine is a compound represented by formula (1):

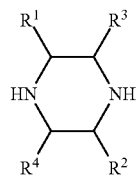

(1)

wherein $R^1$ and $R^2$ each independently represent an alkyl group having 1 to 6 carbon atoms, a phenyl group, a benzyl group, $COOR^5$, $CONHR^5$, $CON(R^5)_2$, or $OR^5$, and $R^5$ represents a hydrogen atom, an alkyl group having 1 to 6 carbon atoms, a phenyl group, or a benzyl group; and $R^3$ and $R^4$ each independently represent hydrogen, an alkyl group having 1 to 6 carbon atoms, a phenyl group, a benzyl group, $COOR^6$, $CONHR^6$, $CON(R^6)_2$, or $OR^6$, and $R^6$ represents a hydrogen atom, an alkyl group having 1 to 6 carbon atoms, a phenyl group, or a benzyl group.

[15] The method of separating and recovering a cobalt salt and a nickel salt according to [2], in which the polyamide is a crosslinked aromatic polyamide having a structure represented by formula (2):

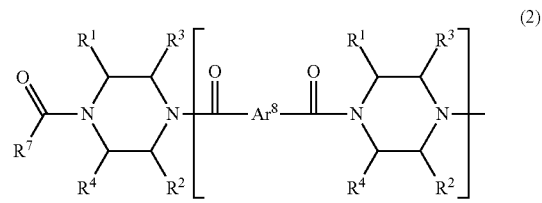

(2)

wherein $R^1$ and $R^2$ each independently represent an alkyl group having 1 to 6 carbon atoms, a phenyl group, a benzyl group, $COOR^5$, $CONHR^5$, $CON(R^5)_2$, or $OR^5$, and $R^5$ represents a hydrogen atom, an alkyl group having 1 to 6 carbon atoms, a phenyl group, or a benzyl group; $R^3$ and $R^4$ each independently represent hydrogen, an alkyl group having 1 to 6 carbon atoms, a phenyl group, a benzyl group, $COOR^6$, $CONHR^6$, $CON(R^6)_2$, or $OR^6$, and $R^6$ represents a hydrogen atom, an alkyl group having 1 to 6 carbon atoms, a phenyl group, or a benzyl group; $R^7$ is an aliphatic chain or an aliphatic ring including only a carbon atom and a hydrogen atom as a constituent element; and $Ar^8$ is an aromatic ring having 6 to 14 carbon atoms which may have a substituent.

With the method of separating and recovering a cobalt salt and a nickel salt according to an example, compared to the solvent extraction method, since there is no need for stationary separation, the scale of the entire facility can be reduced, and the facility cost can be kept low. In addition, the selective separability for cobalt and nickel is higher than that in the method using an ion exchange resin. It is possible to efficiently and stably recover nickel and cobalt from a lithium ion battery in which nickel and cobalt coexist, and waste materials, waste liquid, alloys, ores, and slag which are generated in a production process and a recycling process for the lithium ion battery.

DETAILED DESCRIPTION

Hereinafter, examples of our methods of separating and recovering a cobalt salt and a nickel salt will be described.

The method of separating and recovering a cobalt salt and a nickel salt according to an example is a method of separating and recovering a cobalt salt and a nickel salt including: a separation step of separating, by using a nanofiltration membrane, a cobalt salt and a nickel salt from a rare metal-containing aqueous solution containing at least both the cobalt salt and the nickel salt as rare metals, in which a glucose permeability is 3 times or more a sucrose permeability, the sucrose permeability is 10% or less, and an isopropyl alcohol permeability is 50% or more when a 1,000 mg/L glucose aqueous solution, a 1,000 mg/L sucrose aqueous solution, and a 1,000 mg/L isopropyl alcohol aqueous solution, each having a pH of 6.5 and a temperature of 25°

C., individually permeate the nanofiltration membrane at an operating pressure of 0.5 MPa.

[1] Separation Step

In the present step, permeated water containing a nickel salt and non-permeated water containing a cobalt salt are obtained from a rare metal-containing aqueous solution by using a nanofiltration membrane.

(1) Nanofiltration Membrane

When a 1,000 mg/L glucose aqueous solution, a 1,000 mg/L sucrose aqueous solution, and a 1,000 mg/L isopropyl alcohol aqueous solution, each having a pH of 6.5 and a temperature of 25° C., individually permeate the nanofiltration membrane for use in the present step at an operating pressure of 0.5 MPa, the glucose permeability is 3 times or more, more preferably 5 times or more, and still more preferably 10 times or more the sucrose permeability, the sucrose permeability is 10% or less, more preferably 5% or less, and still more preferably 3% or less, and the isopropyl alcohol permeability is 50% or more, more preferably 80% or more, and still more preferably 90% or more.

When we used a nanofiltration membrane as a separation membrane, we found that the selective separability for a nickel salt and a cobalt salt is improved by particularly applying a nanofiltration membrane that satisfies the above conditions. In general, since the nanofiltration membrane separates ions by utilizing the difference in chargeability and size of ionic species, the nanofiltration membrane exhibits excellent selective separability for a polyvalent ion salt and a monovalent ion salt. On the other hand, since nickel ions and cobalt ions, which are polyvalent ions, are very close in chargeability and the difference in hydrated ion size is also close, it is difficult to obtain high selective separability even with the nanofiltration membrane. We found that the selectivity is improved by using a membrane in which separation performance of neutral molecules of glucose, sucrose, and isopropyl alcohol satisfies the above conditions. By treating a rare metal-containing aqueous solution containing a nickel salt and a cobalt salt using such a nanofiltration membrane, the nickel salt and the cobalt salt can be separated and selectively recovered. As a result, a multi-stage treatment for permeated water and non-permeated water using the nanofiltration membrane is not required or the number of stages can be reduced, which is preferred in that a highly efficient process can be performed.

(2) Raw Water

An aqueous solution to be treated with a nanofiltration membrane or a reverse osmosis membrane is called "raw water". The raw water in the present step may be an aqueous solution obtained in an acid treatment step described later, an aqueous solution obtained by subjecting the above aqueous solution to a pretreatment such as dilution or concentration, or an aqueous solution obtained by performing a mixing step described later.

The raw water contains at least both cobalt and nickel which are polyvalent rare metals.

The total polyvalent rare metal ion concentration in the raw water in the separation step is preferably 100 mg/L or more from the viewpoint of separation efficiency, and preferably 300,000 mg/L or less from the viewpoint of preventing deterioration of membrane performance due to salt precipitation.

(3) Permeated Water and Non-Permeated Water

In the present step, the difference in permeating property of the nanofiltration membrane to nickel ions and cobalt ions can be used to separate nickel and cobalt. That is, the ratio of a nickel ion concentration (mg/L) to a cobalt concentration (mg/L) in the permeated water is higher than the ratio in the rare metal-containing aqueous solution, which is the raw water, and the ratio in the non-permeated water is lower than the ratio in the raw water.

In the present step, it is preferable to obtain permeated water having a ratio of the nickel ion concentration (mg/L) to the cobalt ion concentration (mg/L) of 100 or more. When such permeated water is not obtained by one separation, a plurality of separation steps may be performed as described above. That is, the permeated water or the non-permeated water may be subjected to further separation, and the obtained permeated water may be mixed as necessary to obtain permeated water having such a concentration.

When this ratio is 100 times or more, it can be said that the selective separability for nickel and cobalt is sufficiently high.

(4) Pressure

The operating pressure in the separation step (that is, the pressure of the raw water) is preferably 0.1 MPa or more and 8 MPa or less. Since the membrane permeation rate increases as the pressure increases, a practical membrane permeation rate can be obtained when the pressure is 0.1 MPa or more. In addition, when the pressure is 8 MPa or less, damage to the nanofiltration membrane can be kept to be small. The operating pressure is more preferably 0.5 MPa or more and 6 MPa or less, and still more preferably 1 MPa or more and 4 MPa or less.

When the operating pressure in the separation step is lower than or equal to the osmotic pressure of the raw water, damage to the nanofiltration membrane can be kept to be smaller.

When the separation step includes a plurality of separation steps, the operating pressure in each separation step is preferably in the above range.

(5) Number of Times

The present step may include a plurality of separation steps using the nanofiltration membrane.

For example, the present step may include at least a first separation step and a second separation step, and permeated water and non-permeated water may be obtained in the second separation step by using permeated water obtained in the first separation step as raw water. The second separation step in this example may be referred to as a 2a-th separation step.

The separation step may include at least the first separation step and the 2a-th separation step using the nanofiltration membrane, and the permeated water obtained in the first separation step may be treated in the 2a-th separation step.

In the present step, the permeated water and the non-permeated water may be obtained in the second separation step by using the non-permeated water obtained in the first separation step as raw water. The second separation step in this example may be referred to as a 2b-th separation step.

The separation step may include at least the first separation step and the 2b-th separation step using the nanofiltration membrane, and the non-permeated water obtained in the first separation step may be treated in the 2b-th separation step.

The further separation of the permeated water and the further separation of the non-permeated water may be performed in combination.

The step of further separating the permeated water and the non-permeated water by using the nanofiltration membrane may be performed in combination with a step of diluting the permeated water and the non-permeated water, which is known as a general dialysis filtration method. The solution for use in dilution at this time is not particularly limited, and solution such as pure water or an acid aqueous solution may be used. It is preferable to use permeated water having a low concentration of metal ions generated in a concentration step described later since highly efficient separation and recovery of rare metal ions and reuse of the acid aqueous solution can be performed.

The permeated water obtained in the first separation step may be diluted and then treated in the 2a-th separation step, and the non-permeated water obtained in the first separation step may be diluted and then treated in the 2b-th separation step.

When a plurality of separation steps are included, the obtained permeated water can be mixed or separately used in the next concentration step. All of non-permeated liquids may be mixed or separately used for the recovery of a polyvalent rare metal, or non-permeated liquid may be mixed with the rare metal-containing aqueous solution obtained in the acid treatment step.

[2] Acid Treatment Step

The separation and recovery method may further include, before the separation step, an acid treatment step of bringing a material containing at least both cobalt and nickel as rare metals into contact with an acid aqueous solution to obtain a rare metal-containing aqueous solution.

(1) Rare Metal-Containing Material

The rare metal-containing material contains both nickel and cobalt which are polyvalent rare metals as described above.

In addition, the rare metal-containing material may contain a monovalent rare metal. Specific examples of the monovalent rare metal include lithium and cesium.

In addition, the rare metal-containing material may further contain other polyvalent rare metals. Specific examples of the polyvalent rare metal include beryllium, titanium, chromium, manganese, gallium, germanium, selenium, strontium, zirconium, vanadium, and rare earth elements.

Specific examples thereof include a lithium ion battery, and a waste material, a waste liquid, an alloy, an ore, and a slag generated in a production process and a recycling process therefor. An alloy containing cobalt and nickel is preferred since the purity of the contained rare metal is high, and a lithium ion battery is preferred as the material since there is a high demand for reuse.

A lithium ion battery is composed of members such as a positive electrode material, a negative electrode material, a separator, and an electrolyte. Among these members, a material containing a monovalent rare metal such as lithium can be used as the material. In particular, since the positive electrode material contains a polyvalent rare metal such as cobalt and nickel, and a monovalent rare metal such as lithium, the positive electrode material serves as a recovery source of a plurality of rare metals.

The material may further contain at least one element selected from alkali metals such as sodium and potassium, alkaline earth metals such as magnesium and calcium, typical elements such as aluminum, tin, and lead, and transition elements such as iron and copper.

(2) Acid Aqueous Solution

The acid aqueous solution to be in contact with the above material preferably contains at least one acid of hydrochloric acid, sulfuric acid, nitric acid, formic acid, acetic acid, and oxalic acid.

The contact between the acid aqueous solution and the material may be performed by, for example, immersing the material in the acid aqueous solution. Other methods may be used as long as the target rare metal can be eluted. The temperature of the acid aqueous solution to be in contact with the material is preferably 10° C. or higher and 100° C. or lower from the viewpoint of the elution efficiency of the rare metal salt, and more preferably 20° C. or higher and 80° C. or lower from the viewpoint of cost and safety.

(3) Rare Metal-Containing Aqueous Solution

The obtained rare metal-containing aqueous solution contains salts of rare metals and other metal elements contained in the above material and one or more conjugated bases (for example, a chloride ion, a nitrate ion, a sulfate ion, a carbonate ion, and an acetate ion) contained in the above acid aqueous solution.

[3] Complex Forming Step

It is preferable that the separation and recovery method includes a complex forming step of adding a complex forming agent to a rare metal-containing aqueous solution to form a complex of nickel and cobalt, before the separation step of separating nickel and cobalt from the rare metal-containing aqueous solution by using the nanofiltration membrane.

When the separation and recovery method includes the acid treatment step, it is preferable to include the complex forming step after the acid treatment step and before the separation step.

We found that when a complex forming agent is added to the rare metal-containing aqueous solution, the selective separability for nickel and cobalt using the nanofiltration membrane is greatly improved. In a non-added system, nickel and cobalt are very similar in hydrated ion size and chargeability; however, when a complex forming agent is added, nickel and cobalt interact with the complex forming agent to form a complex, and the size and chargeability of the formed complex change due to the difference in the ability of nickel and cobalt to form a complex. Therefore, the selective separability for nickel ions and cobalt ions, which are difficult to separate, is further improved.

To enhance the ability to form a complex, an oxidizing agent may be added together with the complex forming agent, and hypochlorous acid, hydrogen peroxide, nitric acid and the like are preferred as the oxidizing agent. In adding such an oxidizing agent, the addition amount is preferably 5 mg/L or more. On the other hand, the addition amount is preferably 2,000 mg/L or less to prevent deterioration of separability due to deterioration of the separation membrane.

The complex forming step preferably includes a step of adjusting the pH of the rare metal-containing aqueous solution. The pH of the aqueous solution after adjustment is preferably 1 to 9, and more preferably 3 to 7.

In the range of pH 1 to 9, deterioration of the separation membrane due to acids and alkalis is prevented, and long-term stable separation is possible.

In addition, in the range of pH 7 or less, charges of nickel ions and cobalt ions change due to complex formation due to positive charges derived from aliphatic amino groups in a polyamide, and the separability for nickel and cobalt is improved. Further, in the range of pH 3 or more, negatively charged carboxy groups derived from an acid halide improves the permeating property of nickel ions, permeated water having a high nickel ion concentration can be obtained, and the recovery efficiency is improved.

The addition amount of the complex forming agent is not particularly limited, and from the viewpoint of forming a complex, it is preferably added in an amount of 0.05 equivalents or more relative to the molar concentration of nickel ions and cobalt ions in the rare metal-containing aqueous solution. In addition, from the viewpoint of preventing denaturation of the separation membrane due to the complex forming agent, the concentration is preferably 5 mass % or less.

Examples of the complex forming agent used in the present step include an amine-based ligand. That is, the complex forming step preferably includes a step of adding an amine-based ligand as the complex forming agent.

The complex forming agent to be used preferably has a solubility in water of 100 mg/L or more. When the solubility in water is 100 mg/L or more, the stability and the water solubility of the formed complex in an aqueous solution are increased, nickel and cobalt complexes are formed with high efficiency, and the selective separability is improved.

It is preferable that the separation and recovery method includes a complex forming step of adding a complex forming agent to the rare metal-containing aqueous solution, and the solubility of the complex forming agent in water is 100 mg/L or more.

Since salts of nickel and cobalt usually have low solubility under an alkaline condition of pH 8 or more, a part of them precipitates, making membrane separation difficult. However, since nickel and cobalt form a highly water-soluble complex in the presence of a complex forming agent that is highly soluble in water, stable membrane separation is possible even under an alkaline condition of pH 8 or more.

From the above viewpoints, the complex forming agent to be used is preferably an amine-based ligand such as pyridine, ammonia, an alkylmonoamine having 9 or less carbon atoms in total, ethylenediamine, glycine, iminodiacetic acid, and ethylenediaminetetraacetic acid.

[4] Concentration Step

It is preferable that the separation and recovery method includes a concentration step of concentrating the aqueous solution obtained in the separation step with a reverse osmosis membrane.

In the present step, non-permeated water having a polyvalent rare metal concentration higher than that of the permeated water in the separation step and permeated water having a monovalent rare metal concentration lower than that of the permeated water in the separation step can be obtained by using the reverse osmosis membrane.

(1) Reverse Osmosis Membrane

We found that, by using a reverse osmosis membrane, a loss of a polyvalent rare metal salt, particularly a cobalt salt and a nickel salt, is extremely small regardless of a total salt concentration in raw water, and recovery with high efficiency is stably achieved. Therefore, it is preferable in that a long-term operation is possible, and a highly efficient process can be performed, for example, a multi-stage treatment of concentrated water due to a decrease in ion removability is not required or the number of stages can be reduced.

The details will be described later.

(2) Raw Water

The raw water is the permeated water obtained in the separation step. As described above, the raw water may be a mixture of the permeated water in the plurality of separation steps performed in the separation step. In addition, the raw water may be the permeated water obtained in the separation step, or may be obtained through another step performed between the separation step and the concentration step.

(3) Operating Condition

The operating pressure in the present step (that is, the pressure of the raw water) is preferably 0.5 MPa or more and 12 MPa or less. The membrane permeation rate increases as the pressure increases. When the pressure is 0.5 MPa or more, a practical membrane permeation rate can be obtained. When the operating pressure is 12 MPa or less, damage to the reverse osmosis membrane can be prevented. The operating pressure is more preferably 1 MPa or more and 10 MPa or less, and still more preferably 2 MPa or more and 8 MPa or less.

(4) Number of Times of Concentration

The present step may include a plurality of concentration steps using the reverse osmosis membrane.

For example, the concentration step may include at least a first concentration step and a second concentration step using the reverse osmosis membrane, and the second concentration step may be performed using the non-permeated water obtained in the first concentration step as raw water.

(5) Non-Permeated Water

In the present step, non-permeated water having a polyvalent rare metal ion concentration higher than that of the permeated water or the non-permeated water obtained in the separation step is obtained. The non-permeated water may also be referred to as concentrated water. The "permeated water obtained in the separation step" is an aqueous solution supplied to the reverse osmosis membrane in the concentration step, that is, raw water. For example, when the separation step includes a plurality of separation steps and the raw water in the concentration step is a mixture of the permeated water in the plurality of separation steps, the concentration of the mixture is compared to the concentration of the non-permeated water in the concentration step rather than comparing the concentration of the permeated water in each separation step to the concentration of the non-permeated water in the concentration step.

[5] Recovery Step

Compared to the aqueous solution (raw water) supplied to the nanofiltration membrane in the separation step, the permeated liquid in the separation step has a higher nickel ratio to cobalt, and the non-permeated liquid has a lower nickel ratio to cobalt. In addition, the non-permeated liquid in the concentration step has a higher concentration of nickel or cobalt than the aqueous solution (raw water) supplied to the reverse osmosis membrane. For the recovery of rare metals from these aqueous solutions, solvent extraction, adsorption with an ion exchange membrane or an ion exchange resin, crystallization or the like can be used. The crystallization is induced by concentration of an aqueous solution, heating, cooling, addition of a nucleating agent or addition of a salt, or a combination of these methods.

In general, the crystallization of a polyvalent rare metal salt is inhibited by the presence of an alkali metal ion, and the crystallization becomes easy since the polyvalent rare metal ion and the alkali metal ion are separated by a pre-separation step described later. In addition, since the concentrations of cobalt ions and nickel ions are increased by the concentration step, more efficient recovery is possible.

As the crystallization method, for example, a poorly soluble carbonate or hydroxide salt can be precipitated by adding a salt to an aqueous solution. The carbonate and the hydroxide salt of cobalt and nickel have a solubility smaller than that of an alkali metal salt. By using this difference in solubility, for example, cobalt and nickel can be recovered as carbonates by adding carbonates to a rare metal aqueous solution (specifically, non-permeated liquids in the concentration steps for cobalt and nickel).

When a monovalent rare metal salt is recovered from permeated water (containing the monovalent rare metal salt) in the pre-separation step described later, a step of concentrating with a reverse osmosis membrane or the like may be further performed before recovering.

[6] Mixing Step

The separation and recovery method may further include a mixing step of mixing the permeated water obtained in the concentration step with the rare metal-containing aqueous solution. The aqueous solution obtained in the mixing step can be used as raw water in the separation step.

That is, the separation and recovery method may further include a mixing step of mixing the permeated water generated in the concentration step with the rare metal-containing aqueous solution obtained in the acid treatment step, and in the separation step, the permeated water and concentrated water may be obtained from the mixed water obtained in the mixing step.

A mixing ratio is not limited to a specific value, and may be adjusted such that the aqueous solution obtained by the mixing step has a metal salt concentration suitable for the separation step.

By the mixing step and the subsequent separation step, the rare metal contained in the permeated water in the concentration step can be recovered again. In addition, the acid is also reused.

In addition, the mixing ratio may be adjusted to be an ion concentration ratio suitable for a subsequent step such as the separation step.

[7] Other Steps

It is preferable to provide a pretreatment step using an ultrafiltration membrane (UF membrane) after the acid treatment step and before the separation step. Since the UF membrane can remove organic substances contained in the rare metal-containing aqueous solution, it is possible to prevent the fouling of the nanofiltration membrane and the accompanying decrease in treatment efficiency.

In addition, it is preferable to provide a pre-separation step using a nanofiltration membrane after the acid treatment step and before the separation step. When the pre-separation step is provided, alkali metals contained in the rare metal-containing aqueous solution can be separated by the nanofiltration membrane from cobalt and nickel, which are objects of separation in the above separation step, and selective separation for cobalt and nickel in the subsequent separation step can be performed with high efficiency. Specifically, providing the pre-separation step of treating an aqueous solution containing nickel and cobalt with a nanofiltration membrane to obtain permeated water containing an alkali metal salt and non-permeated water containing a polyvalent rare metal salt is preferred from the viewpoint of being able to separate and recover highly purified nickel salts and cobalt salts with high efficiency. In this step, it is preferable to obtain permeated water having a ratio of an alkali metal ion concentration (mg/L) to a polyvalent rare metal ion concentration (mg/L) of 100 or more.

It is preferable that the separation and recovery method includes, before the separation step, a pre-separation step of separating an alkali metal salt and a polyvalent rare metal salt by using a nanofiltration membrane, and that permeated water in which an alkali metal ion concentration (mg/L) is 100 times or more a polyvalent rare metal ion concentration (mg/L) is obtained.

When such permeated water is not obtained by one separation, a plurality of separation steps may be performed as described above. That is, the permeated water or the non-permeated water may be subjected to further separation, and the obtained permeated water may be mixed as necessary to obtain permeated water having such a concentration.

When this ratio is 100 times or more, the selective separability for the alkali metal salt and the polyvalent rare metal is sufficiently high, and a high-purity nickel salt and cobalt salt can be obtained in the subsequent separation step of separating nickel and cobalt.

A mass of the polyvalent rare metal is calculated by, for example, a total ion equivalent mass of cobalt ions, nickel ions and the like. In addition, the alkali metal ion equivalent mass is calculated by summing the ion equivalent masses of lithium ions, cesium ions and the like. Depending on the element, the element may be present in the aqueous solution as a multiatomic ion instead of a monoatomic ion, and the equivalent mass is a mass when it is assumed that the element is present as a monoatomic ion. The polyvalent and alkali metal ion equivalent masses can be determined, for example, by analyzing the aqueous solution to be measured using a P-4010 type ICP (high frequency inductive coupling plasma emission spectrometry) apparatus manufactured by Hitachi, Ltd., and quantifying the concentration (mg/L) of various rare metal ions.

[8] Nanofiltration Membrane and Reverse Osmosis Membrane

The nanofiltration membrane and the reverse osmosis membrane are preferably a composite semipermeable membrane including a support membrane and a separation function layer formed on the support membrane. The separation function layer has substantially separation performance, and the support membrane allows water to pass through but has substantially no separation performance for ions and the like, and can impart strength to the separation function layer.

The nanofiltration membrane referred to herein is a membrane defined by IUPAC as "a pressure driven membrane by which particles and polymers having a size smaller than 2 nm are blocked". The nanofiltration membrane effective for application to our methods is preferably a membrane which has a charge on the membrane surface and in which the ion separation efficiency is particularly improved by a combination of separation by pores (size separation) and electrostatic separation by charges on the membrane surface. It is necessary to apply a nanofiltration membrane capable of separating cobalt and nickel which are recovery objectives according to the charge and the size.

The nanofiltration membrane is a membrane in a region having fractionation characteristics positioned between a reverse osmosis membrane and an ultrafiltration membrane. A membrane commonly known as the reverse osmosis membrane actually tends to remove most of organic substances and ions, and on the other hand, the ultrafiltration membrane usually does not remove most of ion species, but removes high-molecular-weight organic substances.

As a method of producing the composite semipermeable membrane element, methods disclosed in JPS44-14216B, JPH04-11928B, or JPH11-226366A, can be used.

(1) Support Membrane

In this example, the support membrane includes a base material and a porous support layer. This disclosure is not limited to this configuration. For example, the support membrane may be composed of only the porous support layer without including the base material.

(1-1) Base Material

Examples of the base material include a polyester-based polymer, a polyphenylene sulfide-based polymer, a polyamide-based polymer, a polyolefin-based polymer, and a mixture or copolymer thereof. Among them, a fabric of a polyester-based polymer or a polyphenylene sulfide-based polymer having high mechanical and thermal stability is particularly preferred. As a form of the fabric, a long fiber nonwoven fabric, a short fiber nonwoven fabric, and further a woven or knitted fabric can be preferably used.

(1-2) Porous Support Layer

The porous support layer has substantially no separation performance for ions or the like, and is for imparting strength to the separation function layer having substantially the separation performance. The size and the distribution of the pores in the porous support layer are not particularly limited. For example, it is preferable to use a porous support layer having uniform and fine pores or having pores that become larger gradually from the surface of a side on which the separation function layer is formed to the other surface and having a size of the fine pores of 0.1 nm or more and 100 nm or less on the surface of the side on which the separation function layer is formed. A material for use in the porous support layer and a shape thereof are not particularly limited.

As the material of the porous support layer, for example, homopolymers or copolymers such as a polysulfone, polyethersulfone, a polyamide, a polyester, a cellulose-based polymer, a vinyl polymer, polyphenylene sulfide, polyphenylene sulfide sulfone, polyphenylene sulfone, and a polyphenylene oxide can be used alone or in combination. Examples of the cellulose-based polymer include cellulose acetate and cellulose nitrate, and examples of the vinyl polymer include polyethylene, polypropylene, polyvinyl chloride, and polyacrylonitrile.

Among them, homopolymers or copolymers such as a polysulfone, a polyamide, a polyester, cellulose acetate, cellulose nitrate, polyvinyl chloride, polyacrylonitrile, polyphenylene sulfide, and polyphenylene sulfide sulfone are preferred. More preferred is cellulose acetate, a polysulfone, polyphenylene sulfide sulfone, and polyphenylene sulfone. Further, among these materials, a polysulfone can be generally used because of having high chemical, mechanical, and thermal stability and being easy to be formed.

The polysulfone preferably has a mass average molecular weight (Mw) of 10,000 or more and 200,000 or less, more preferably 15,000 or more and 100,000 or less, when measured by gel permeation chromatography (GPC) using N-methylpyrrolidone as a solvent and polystyrene as a standard substance.

When the Mw of the polysulfone is 10,000 or more, preferred mechanical strength and heat resistance can be obtained as the porous support layer. When the Mw is 200,000 or less, the viscosity of the solution falls within an appropriate range, and good formability can be realized.

The thicknesses of the base material and the porous support layer influence the strength of the composite semipermeable membrane and the packing density when the composite semipermeable membrane is used as an element. To obtain sufficient mechanical strength and packing density, the total thickness of the base material and the porous support layer is preferably 30 μm or more and 300 μm or less, and more preferably 100 μm or more and 220 μm or less. The thickness of the porous support layer is preferably 20 μm or more and 100 μm or less. Unless otherwise noted, the thickness means an average value. The average value represents an arithmetic average value. That is, the thicknesses of the base material and the porous support layer are obtained by calculating an average value of thicknesses at 20 points measured at intervals of 20 μm in a direction (surface direction of the membrane) orthogonal to the thickness direction in cross section observation.

(2) Separation Function Layer

The separation function layer of the nanofiltration membrane and the reverse osmosis membrane is a layer responsible for the separation function of a solute in the composite semipermeable membrane. The separation function layer of the nanofiltration membrane is a layer made of a polyamide mainly containing a polyfunctional aliphatic amine and a polyfunctional acid halide as raw materials, and the separation function layer of the reverse osmosis membrane is a layer made of a polyamide mainly containing a polyfunctional aromatic amine and a polyfunctional acid halide as raw materials.

(2-1) Separation Function Layer of Nanofiltration Membrane

For the separation function layer of the nanofiltration membrane, a polymer material such as a cellulose acetate-based polymer, a polyamide, a sulfonated polysulfone, polyacrylonitrile, a polyester, a polyimide, or a vinyl polymer can be used. The membrane is not limited to the membrane composed of only one of these materials, and may be a membrane containing a plurality of materials. In addition, the membrane structure may be an asymmetric membrane having a dense layer on at least one surface of the membrane and having fine pores having a pore diameter gradually increasing from the dense layer toward the inside of the membrane or toward the other surface, or a composite membrane having a very thin function layer formed of another material on the dense layer of the asymmetric membrane. As the composite membrane, for example, a composite membrane which is described in JPS62-201606A and in which a nano-filter including a function layer made of a polyamide is formed on a support membrane formed of a polysulfone as a membrane material can be used.

Among them, the nanofiltration membrane for use in the separation step is preferably a composite membrane having a polyamide as a separation function layer, which has a high pressure resistance and a high water permeating property and has an excellent potential. To maintain resistance against the operating pressure, a high water permeating property, and ion separation performance, a structure in which a polyamide is used as a function layer and the function layer is held by a support formed of a porous membrane or nonwoven fabric is suitable. The separation function layer made of a polyamide is suitably a composite semipermeable membrane including, on a support, a function layer made of a crosslinked polyamide obtained by a polycondensation reaction of a polyfunctional aliphatic amine and a polyfunctional acid halide since the pore diameter distribution can be controlled to be suitable for selective separation of cobalt and nickel.

When a 1,000 mg/L glucose aqueous solution, a 1,000 mg/L sucrose aqueous solution, and a 1,000 mg/L isopropyl alcohol aqueous solution, each having a pH of 6.5 and a temperature of 25° C., individually permeate through the nanofiltration membrane at an operating pressure of 0.5 MPa, the glucose permeability is 3 times or more the sucrose permeability, the sucrose permeability is 10% or less, and the isopropyl alcohol permeability is 50% or more, whereby high selective separation performance for cobalt and nickel can be achieved.

The glucose permeability is 3 times or more, more preferably 5 times or more, and still more preferably 10 times or more the sucrose permeability. When the glucose permeability is 3 times or more the sucrose permeability, the pore diameter distribution of the membrane is narrowed, and high selective separation performance effective for separating cobalt and nickel can be exhibited. In addition, the sucrose permeability is 10% or less, more preferably 5% or less, and still more preferably 3% or less. When the sucrose permeability is 10% or less, there are few coarse pores in the membrane so that high selective separation performance for cobalt and nickel can be obtained. Further, the isopropyl alcohol permeability is 50% or more, more preferably 80% or more, and still more preferably 90% or more. When the isopropyl alcohol permeability is 50% or more, the amount of the aqueous solution that permeates through the membrane increases, and cobalt and nickel can be separated with high efficiency.

It is preferable that the polyamide separation function layer in the nanofiltration membrane contains a polyamide having a structure derived from a polyfunctional aliphatic amine and a structure derived from a polyfunctional acid halide. It is more preferable that the polyfunctional aliphatic amine is a compound represented by formula (1).

It is preferable that the nanofiltration membrane includes a base material, a support membrane on the base material, and a separation function layer on the support membrane, and the separation function layer contains a polyamide having a structure derived from a polyfunctional aliphatic amine and a structure derived from a polyfunctional acid halide.

Specifically, it is preferable to contain a crosslinked polyamide obtained by interfacial polymerization between a piperazine-based compound represented by formula (1) and a polyfunctional acid halide being divalent or higher. The separation function layer preferably contains 90 mass % or more of the crosslinked polyamide, and more preferably contains only the crosslinked polyamide. When this crosslinked polyamide is contained in a large amount, it is possible to achieve both high selective separability for nickel and cobalt and excellent acid resistance and oxidation resistance of the separation function layer, enabling highly efficient and stable membrane operation over a long period of time.

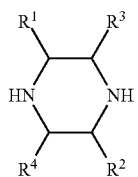

(1)

When the nanofiltration membrane includes a separation function layer containing a polymer of the piperazine-based compound represented by formula (1) and the polyfunctional acid halide being divalent or higher, substituents close to the amide group in the piperazine ring increase the spacing of the crosslinked polyamide chains, resulting in a membrane having a pore diameter distribution suitable for separating cobalt and nickel. Therefore, it is preferable in that a highly efficient process can be performed, for example, a multi-stage treatment of permeated water and non-permeated water is not required or the number of stages can be reduced.

In formula (1), $R^1$ and $R^2$ each independently represent an alkyl group having 1 to 6 carbon atoms, a phenyl group, a benzyl group, $COOR^5$, $CONHR^5$, $CON(R^5)_2$, or $OR^5$, and $R^5$ represents hydrogen, an alkyl group having 1 to 6 carbon atoms, a phenyl group, or a benzyl group. $R^3$ and $R^4$ each independently represent hydrogen, an alkyl group having 1 to 6 carbon atoms, a phenyl group, a benzyl group, $COOR^6$, $CONHR^6$, $CON(R^6)_2$, or $OR^6$, and $R^6$ represents hydrogen, an alkyl group having 1 to 6 carbon atoms, a phenyl group, or a benzyl group. Examples of the alkyl group having 1 to 6 carbon atoms in $R^1$ to $R^6$ include linear or branched methyl, ethyl, propyl, butyl, pentyl, hexyl, and cyclic cyclopropyl, cyclobutyl, cyclopentyl, cyclohexyl. $R^1$ and $R^2$ are each independently preferably an alkyl group having 1 to 6 carbon atoms, a phenyl group, or a benzyl group, and particularly preferably an alkyl group having 3 to 6 carbon atoms, a phenyl group, or a benzyl group. $R^3$ and $R^4$ are each independently preferably hydrogen, an alkyl group having 1 to 6 carbon atoms, a phenyl group, or a benzyl group. By introducing the substituent into the piperazine structure, steric hindrance in the vicinity of the amide group and the pore diameter distribution (molecular gap) of the polyamide crosslinked structure can be suitably controlled, and the water permeating property and the selective separability can be maintained. When the carbon number in the substituent is too large, the crosslinking reaction of the polyamide is difficult to proceed due to the steric hindrance, and the selective separability is deteriorated. The piperazine-based compound represented by formula (1) may be used alone, or two or more kinds thereof may be used in combination.

The polyfunctional acid halide is an acid halide having two or more halogenated carbonyl groups in one molecule, and is not particularly limited as long as it gives a polyamide by a reaction with the piperazine-based compound. Examples of the polyfunctional acid halide include halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, 1,4-benzenedicarboxylic acid, 1,3,5-benzenetrisulfonic acid, and 1,3,6-naphthalenetrisulfonic acid. Among the acid halides, preferred is an acid chloride, and particularly preferred is trimesic acid chloride which is an acid halide of 1,3,5-benzenetricarboxylic acid, isophthalic acid chloride which is an acid halide of 1,3-benzenedicarboxylic acid, terephthalic acid chloride which is an acid halide of 1,4-benzenedicarboxylic acid, 1,3,5-benzenetrisulfonic acid chloride which is an acid halide of 1,3,5-benzenetrisulfonic acid, and 1,3,6-naphthalenetrisulfonic acid chloride which is an acid halide of 1,3,6-naphthalenetrisulfonic acid, from the viewpoint of economic efficiency, easy availability, easy handling, easy reactivity and the like. The polyfunctional acid halide may be used alone or as a mixture of two or more thereof. By mixing any one of bifunctional isophthalic acid chloride and terephthalic acid chloride with trifunctional trimesic acid chloride, 1,3,5-benzenetrisulfonic acid chloride, or 1,3,6-naphthalenetrisulfonic acid chloride, the molecular gap of the polyamide crosslinked structure is increased, and a membrane having a uniform pore diameter distribution can be controlled in a wide range. A mixing molar ratio of the trifunctional acid chloride to the bifunctional acid chloride is preferably 1:20 to 50:1, and more preferably 1:1 to 20:1.

It is preferable that the separation function layer in the nanofiltration membrane has a thin membrane made of the crosslinked polyamide, and the thin membrane forms a fold structure in which convex portions and concave portions are repeated. By having the fold structure including convex portions and concave portions, the surface area of the separation function layer is increased, and a high water permeating property is obtained. The presence or absence of the fold structure and the specific surface area can be evaluated by measurement with an electron microscope, a molecular force microscope or the like.

The crosslinked polyamide is preferably a crosslinked aromatic polyamide, and more preferably a crosslinked aromatic polyamide having a structure represented by formula (2). Since a terminal amino group in the crosslinked polyamide is positively charged under acidic conditions, the selective separability for ions is reduced due to swelling of the membrane. Therefore, by having the structure represented by formula (2), high selective separability for cobalt and nickel can be stably maintained for a long period of time.

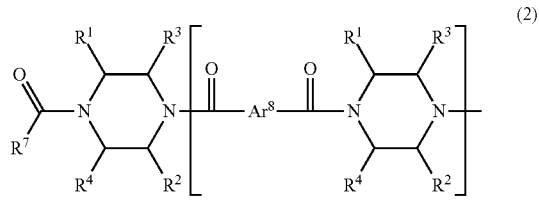

(2)

$R^1$ and $R^2$ each independently represent an alkyl group having 1 to 6 carbon atoms, a phenyl group, a benzyl group, $COOR^5$, $CONHR^5$, $CON(R^5)_2$, or $OR^5$, and $R^5$ represents a hydrogen atom, an alkyl group having 1 to 6 carbon atoms, a phenyl group, or a benzyl group. $R^3$ and $R^4$ each independently represent hydrogen, an alkyl group having 1 to 6 carbon atoms, a phenyl group, a benzyl group, $COOR^6$, $CONHR^6$, $CON(R^6)_2$, or $OR^6$, and $R^6$ represents a hydrogen atom, an alkyl group having 1 to 6 carbon atoms, a phenyl group, or a benzyl group. $R^7$ is an aliphatic chain or an aliphatic ring containing only a carbon atom and a hydrogen atom as a constituent element, and $Ar^8$ is an aromatic ring having 6 to 14 carbon atoms which may have a substituent.

(2-2-2) Separation Function Layer of Reverse Osmosis Membrane

The separation function layer of the reverse osmosis membrane contains a cellulose acetate-based polymer and a polyamide, and it is preferable to use a polyamide from the viewpoint of chemical stability to acids and alkalis and ion removability. In particular, the separation function layer preferably contains a crosslinked aromatic polyamide as a main component. The term "main component" refers to a component that occupies 50 mass % or more of components of the separation function layer. When the separation function layer contains 50 mass % or more of the crosslinked aromatic polyamide, high removal performance can be exhibited. A content of the crosslinked aromatic polyamide in the separation function layer is preferably 90 mass % or more, and more preferably 95 mass % or more.

The reverse osmosis membrane includes a separation function layer containing a crosslinked aromatic polyamide that is a polymer of a polyfunctional aromatic amine and a polyfunctional aromatic acid halide. It is preferable that at least one of the polyfunctional aromatic amine and the polyfunctional aromatic acid halide contains a functional compound being trifunctional or higher. As a result, a rigid molecular chain is obtained, and a good pore structure for concentrating a solute having a small ion size of nickel ions or the like is formed. Therefore, the polyamide separation function layer in the reverse osmosis membrane preferably contains a crosslinked aromatic polyamide obtained by interfacial polymerization between a polyfunctional aromatic amine and a polyfunctional aromatic acid halide being divalent or higher.

The separation function layer includes a thin membrane made of the crosslinked aromatic polyamide, and the thin membrane forms a fold structure in which convex portions and concave portions are repeated. By having the fold structure including convex portions and concave portions, the surface area of the separation function layer can be increased, and a high water permeating property can be obtained.

The polyfunctional aromatic amine means an aromatic amine which has two or more amino groups of at least one of a primary amino group and a secondary amino group in one molecule and in which at least one of the amino groups is a primary amino group. Examples of the polyfunctional aromatic amine include: polyfunctional aromatic amines in which two amino groups are bonded to an aromatic ring in a positional relationship any of an ortho position, a meta position, or a para position such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine; and polyfunctional aromatic amines such as 1,3,5-triaminobenzene, 1,2,4-triaminobenzene, 3,5-diaminobenzoic acid, 3-aminobenzylamine, and 4-aminobenzylamine. In particular, m-phenylenediamine, p-phenylenediamine, and 1,3,5-triaminobenzene are preferably used in consideration of selective separability, permeating property, and heat resistance of the membrane. Among them, m-phenylenediamine (also "m-PDA") is more preferably used from the viewpoint of easy availability and easy handling. These polyfunctional aromatic amines may be used alone or in combination of two or more kinds thereof.

The polyfunctional aromatic acid halide is an aromatic acid halide having two or more halogenated carbonyl groups in one molecule, and is not particularly limited as long as it gives an aromatic polyamide by a reaction with the polyfunctional aromatic amine. Examples of the polyfunctional aromatic acid halide include halides of 1,3,5-benzenetricarboxylic acid, 1,2,4-benzenetricarboxylic acid, 1,3-benzenedicarboxylic acid, 1,4-benzenedicarboxylic acid, 1,3,5-benzenetrisulfonic acid, and 1,3,6-naphthalenetrisulfonic acid. Among the acid halides, preferred is an acid chloride, and particularly preferred is trimesic acid chloride which is an acid halide of 1,3,5-benzenetricarboxylic acid, isophthalic acid chloride which is an acid halide of 1,3-benzenedicarboxylic acid, terephthalic acid chloride which is an acid halide of 1,4-benzenedicarboxylic acid, 1,3,5-benzenetrisulfonic acid chloride which is an acid halide of 1,3,5-benzenetrisulfonic acid, and 1,3,6-naphthalenetrisulfonic acid chloride which is an acid halide of 1,3,6-naphthalenetrisulfonic acid, from the viewpoint of economic efficiency, easy availability, easy handling, easy reactivity and the like. The polyfunctional acid halide may be used alone or as a mixture of two or more thereof. By mixing any one of bifunctional isophthalic acid chloride and terephthalic acid chloride with trifunctional trimesic acid chloride, 1,3,5-benzenetrisulfonic acid chloride, or 1,3,6-naphthalenetrisulfonic acid chloride, the molecular gap of the polyamide crosslinked structure is increased, and a membrane having a uniform pore diameter distribution can be controlled in a wide range. A mixing molar ratio of the trifunctional acid chloride to the bifunctional acid chloride is preferably 1:20 to 50:1, and more preferably 1:1 to 20:1.

The crosslinked aromatic polyamide has an amide group derived from a polymerization reaction between a polyfunctional aromatic amine and a polyfunctional aromatic acid chloride, and an amino group and a carboxy group derived from an unreacted terminal functional group. The amount of these functional groups influences the water permeating performance and the salt removal ratio of the composite semipermeable membrane.

We found that an amide group ratio represented by the following equation being 0.80 or more and 1.20 or less is preferred since high resistance to acids and alkalis can be obtained in addition to a high water permeating property and selective separability. The amide group ratio is more preferably 0.90 or more and 1.10 or less. When the amide group ratio is less than 0.80, the crosslinked structure of the polyamide is not sufficiently formed so that the resistance to acids and alkalis is low, and conversely, when the amide group ratio is more than 1.20, the resistance to acids and alkalis is further increased, but the denseness is too high, resulting in a great reduction in the water permeating property and the selective separability.

(Amide group ratio)=(amide group molar ratio)/{
(polyfunctional aromatic amine molar ratio)+
(polyfunctional acid halide molar ratio)}

In the above equation, the amide group molar ratio, the polyfunctional aromatic amine molar ratio, and the polyfunctional acid halide molar ratio can be determined by $^{13}C$-solid NMR measurement of the separation function layer described above.

When a chemical treatment is performed after the formation of the crosslinked aromatic polyamide, the functional group in the crosslinked aromatic polyamide can be converted, or a new functional group can be introduced into the crosslinked aromatic polyamide. Therefore, the amount of permeated water through the composite semipermeable membrane and the salt removal ratio can be improved. Examples of the functional group to be introduced include an alkyl group, an alkenyl group, an alkynyl group, a hydroxy group, an amino group, a carboxy group, an ether group, a thioether group, an ester group, an aldehyde group, a nitro group, a nitroso group, a nitrile group, and an azo group.

[9] Method of Producing Nanofiltration Membrane and Reverse Osmosis Membrane
(1) Forming Step of Separation Function Layer
(1-1) Forming Step of Separation Function Layer of Reverse Osmosis Membrane As an example of the method of producing the reverse osmosis membrane, a forming step of a separation function layer which has the following polymerization step and modification step will be described in this section.

The polymerization step is a step of forming a layer containing a crosslinked aromatic polyamide having a structure represented by formula (3) on a porous support layer of a membrane having a base material and the porous support layer on the base material.

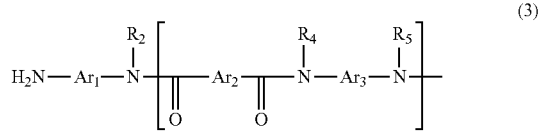

(3)

$Ar_1$ to $Ar_3$ are each independently an aromatic ring having 5 to 14 carbon atoms which may have a substituent, and $R_3$ to $R_5$ are each independently a hydrogen atom or an aliphatic chain having 1 to 10 carbon atoms.

Specifically, the polymerization step is a step of forming a crosslinked aromatic polyamide by polycondensation of a polyfunctional aromatic amine and a polyfunctional aromatic acid chloride. More specifically, the polymerization step includes a step of bringing an aqueous solution containing a polyfunctional aromatic amine into contact with the porous support layer, and then a step of bringing a polyfunctional aromatic acid chloride solution into contact with the porous support layer.

In this section, an example where the support membrane includes a base material and a porous support layer is described, but when the support membrane has another configuration, the "porous support layer" may be read as the "support membrane".

The crosslinked aromatic polyamide constituting the separation function layer in the reverse osmosis membrane preferably contains a polymer of m-phenylenediamine and trimesic acid chloride.

A concentration of the polyfunctional aromatic amine in the polyfunctional aromatic amine aqueous solution is preferably 0.1 mass % or more and 20 mass % or less, and more preferably 0.5 mass % or more and 15 mass % or less. When the concentration of the polyfunctional aromatic amine is in this range, sufficient solute removal performance and water permeating property can be obtained.

After the polyfunctional aromatic amine aqueous solution is brought into contact with the porous support layer, the liquid is removed such that liquid droplets do not remain on the membrane. By performing the liquid removal, it is possible to prevent the removal performance from being deteriorated due to the membrane defect caused by the liquid droplet remaining portion after the formation of the porous support layer. As a liquid removal method, a method of holding the support membrane after the contact with the polyfunctional aromatic amine aqueous solution in a vertical direction and allowing an excessive aqueous solution to naturally flow down, a method of forcibly removing the liquid by blowing an air flow such as nitrogen from an air nozzle, or the like can be used. In addition, after the liquid removal, the membrane surface may be dried to remove a part of the moisture in the aqueous solution.

A concentration of the polyfunctional aromatic acid chloride in an organic solvent solution is preferably 0.01 mass % or more and 10 mass % or less, and more preferably 0.02 mass % or more and 2.0 mass % or less. When the concentration is 0.01 mass % or more, a sufficient reaction rate can be obtained. When the concentration is 10 mass % or less, the occurrence of a side reaction can be prevented.

The organic solvent is preferably immiscible with water, dissolves the polyfunctional aromatic acid chloride, and does not break the support membrane, and may be inert to the polyfunctional aromatic amine and the polyfunctional aromatic acid chloride. Preferred examples thereof include hydrocarbon compounds such as n-nonane, n-decane, n-undecane, n-dodecane, isooctane, isodecane, and isododecane, and mixed solvents.

The contact of the organic solvent solution of the polyfunctional aromatic acid chloride with the porous support layer may be performed in the same manner as in the method of coating the porous support layer with the polyfunctional aromatic amine aqueous solution.

After the contact, the liquid may be removed in the same manner as in the polyfunctional aromatic amine aqueous solution. In addition to the examples recited for the polyfunctional aromatic amine aqueous solution, a mixed fluid of water and air may be used for the liquid removal.

At the interface between the polyfunctional aromatic amine aqueous solution and the polyfunctional aromatic acid chloride solution, the polyfunctional aromatic amine and the polyfunctional aromatic acid chloride, which are monomers, are polycondensed to produce a crosslinked aromatic polyamide. The polycondensation is preferably performed at 80° C. or lower. The phrase "polycondensation is performed at 80° C. or lower" means that at least the temperature around the support membrane from the time of coating with the polyfunctional aromatic acid chloride to the subsequent liquid removal and the temperature of the polyfunctional aromatic acid chloride solution are 80° C. or lower.

By cleaning the thus-obtained membrane with hot water, unreacted monomers can be removed. The temperature of the hot water is 40° C. or higher and 100° C. or lower, and preferably 60° C. or higher and 100° C. or lower.

In the modification step, a reaction with an aliphatic carboxylic acid derivative is performed on the composite semipermeable membrane obtained through the above steps. The aliphatic carboxylic acid derivative may be brought into contact with the composite semipermeable membrane as it is, or may be dissolved in a solvent that does not change the quality of the support membrane and brought into contact with the composite semipermeable membrane.

As a method of bringing the aliphatic carboxylic acid derivative into contact with the composite semipermeable membrane, a reaction may be performed by coating the separation function layer of the composite semipermeable membrane, or a reaction may be performed by immersing the membrane including the separation function layer in the aliphatic carboxylic acid derivative or a solution containing the aliphatic carboxylic acid derivative.

The reaction time and temperature at the time of coating the composite semipermeable membrane with the aliphatic carboxylic acid derivative as an aqueous solution or as it is can be appropriately adjusted depending on the type of the aliphatic carboxylic acid derivative and the coating method. When coating is performed using the aliphatic carboxylic acid derivative as an aqueous solution, the concentration of the aqueous solution is preferably 10 mmol/L to 100 mmol/L, and more preferably 100 mmol/L, from the viewpoint of the effect of improving the acid resistance and the chlorine resistance of the separation function layer.

(2-2) Forming Step of Separation Function Layer of Nanofiltration Membrane

Next, a forming step of the separation function layer constituting the nanofiltration membrane will be described. As an example of the method of producing the nanofiltration membrane, a forming step of a separation function layer which has the following polymerization step and modification step will be described in this section.

In the forming step of the separation function layer, an aqueous solution containing a bipiperazine-based compound or a piperazine-based compound and an organic solvent solution containing a polyfunctional acid halide are used to perform interfacial polycondensation on the surface of the porous support layer, thereby forming a polyamide separation function layer.

As an organic solvent for dissolving the polyfunctional acid halide, used is an organic solvent which is immiscible with water, does not break the support membrane, does not inhibit the formation reaction of the crosslinked polyamide, has a solubility parameter (SP value) of 15.2 $(MPa)^{1/2}$ or more, and has a distribution coefficient log P of 3.2 or more. When the SP value is 15.2 $(MPa)^{1/2}$ or more and the log P is 3.2 or more, the distribution and diffusion of the polyfunctional aliphatic amine during the interfacial polycondensation are controlled, and the amount of functional groups can be increased. Typical examples thereof include octane, nonane, decane, undecane, dodecane, tridecane, tetradecane, heptadecane, hexadecane, cyclooctane, ethylcyclohexane, 1-octene, 1-decene, and a mixture thereof.

The aqueous solution containing a bipiperazine-based compound or a piperazine-based compound may contain a surfactant. Examples thereof include sodium dodecyl benzene sulfonate, sodium dodecyl sulfate, sodium dodecyl diphenyl ether disulfonate, styrene bis(sodium naphthalene sulfonate), and sodium polyoxyethylene alkyl ether sulfate. When a surfactant is contained, the surface of the porous support layer can be uniformly coated with the aqueous solution containing a piperazine-based compound so that the separation function layer can be uniformly formed, and the effect of stabilizing the membrane performance and the effect of increasing the adhesiveness between the separation function layer and the porous support layer can be obtained.

The aqueous solution containing a bipiperazine-based compound or a piperazine-based compound may contain an alcohol. Examples thereof include ethanol, 1-propanol, 2-propanol, and butanol. When an alcohol is contained, the same effects as those of the surfactant described above can be obtained.

The aqueous solution containing a bipiperazine-based compound or a piperazine-based compound may contain an alkaline compound. Examples thereof include sodium hydroxide, trisodium phosphate, and triethylamine. When an alkaline compound is contained, a hydrogen halide generated by the interfacial polycondensation reaction can be removed, a decrease in reactivity of the piperazine-based compound can be prevented, the polyamide reaction can be promoted, the selective separability can be improved, and the resistance to acids and alkalis can be improved.

The aqueous solution containing a bipiperazine-based compound or a piperazine-based compound or the organic solvent solution containing a polyfunctional acid halide may each contain a compound such as an acylation catalyst, a polar solvent, an acid-trapping agent, or an antioxidant, if necessary.

To perform interfacial polycondensation on the porous support layer, first, the surface of the porous support layer is coated with the aqueous solution containing a bipiperazine-based compound or a piperazine-based compound. The method of coating the surface of the porous support layer with the aqueous solution containing a bipiperazine-based compound or a piperazine-based compound may be any method as long as the surface of the porous support layer is uniformly and continuously coated with the aqueous solution. Known coating methods, for example, a method of coating the surface of the porous support layer with an aqueous solution, a method of immersing the support membrane in an aqueous solution, or the like may be used. The contact time between the porous support layer and the aqueous solution containing a bipiperazine-based compound or a piperazine-based compound is preferably 5 seconds or longer and 10 minutes or shorter, and more preferably 10 seconds or longer and 2 minutes or shorter.

Next, it is preferable to remove the excessively applied aqueous solution by a liquid removal step. As a liquid removal method, for example, there is a method of holding the membrane surface in the vertical direction and allowing the liquid to naturally flow down. After the liquid removal, the membrane surface may be dried to remove all or a part of the water in the aqueous solution.

A concentration of the bipiperazine-based compound or the piperazine-based compound in the aqueous solution is preferably 0.5 mass % or more and 5.0 mass % or less, more preferably 1.0 mass % or more and 4.0 mass % or less, and still more preferably 2.0 mass % or more and 3.0 mass % or less. When the concentration is 0.5 mass % or more, a uniform separation function layer is easily formed, and a membrane having sufficient selective separability and resistance to acids and alkalis can be obtained. In addition, when the concentration is 5.0 mass % or less, the thickness of the separation function layer does not become too thick, and a decrease in water permeating performance can be prevented.

Thereafter, an organic solvent solution containing the polyfunctional acid halide is applied to the porous support layer coated with the aqueous solution containing a bipiperazine-based compound or a piperazine-based compound. The coating temperature is preferably 5° C. or higher and 45° C. or lower.

When trimesic acid chloride is contained as the polyfunctional acid halide, the concentration of the trimesic acid chloride in the organic solvent solution is preferably about 0.05 mass % or more and 0.7 mass % or less, and more preferably 0.08 mass % or more and 0.3 mass % or less. Within this range, sufficient water permeating performance, selective separation performance, and resistance to acids and alkalis can be obtained. When another trifunctional acid chloride or bifunctional acid chloride is used, a molar concentration of the acid chloride is adjusted to be about the same in accordance with a molecular weight ratio of the trimesic acid chloride described above.

In this manner, the polyfunctional aliphatic amine and the polyfunctional acid halide are brought into contact with each other, thereby performing interfacial polymerization of them. The interfacial polymerization is preferably performed under a temperature condition of 30° C. or higher, and more preferably performed under a temperature condition of 50° C. or higher. The interfacial polymerization is preferably performed under a temperature condition of 120° C. or lower. When the interfacial polymerization is performed at 30° C. or higher, in the interfacial polymerization reaction, a decrease in the mobility of the monomer or oligomer due to an increase in the bulkiness of the polyamide can be prevented, and the amide group ratio becomes easy to be 0.80 or more. In addition, when the interfacial polymerization is performed at 120° C. or lower, overdrying of the separation function layer and the porous support layer can be prevented, and a practical water permeating property can be secured.

The interfacial polymerization time is preferably 0.1 seconds or longer and 3 minutes or shorter, and more preferably 0.1 seconds or longer and 1 minute or shorter.

Next, the organic solvent solution after the reaction is preferably removed by a liquid removal step. The organic solvent can be removed by, for example, a method of holding a membrane in a vertical direction and allowing an excessive organic solvent to naturally flow down, a method of drying an organic solvent by blowing air with a blower, or a method of removing an excess organic solvent with a mixed fluid of water and air. In particular, removal by a mixed fluid of water and air is preferred. When a mixed fluid of water and air is used, water is contained in the separation function layer, which causes swelling and results in a high water permeating property. In a natural flow-down, the holding time in the vertical direction is preferably 1 minute or longer and 5 minutes or shorter, and more preferably 1 minute or longer and 3 minutes or shorter. When the holding time is 1 minute or longer, it is easy to obtain a separation function layer having a target function, and when the holding time is 3 minutes or shorter, it is possible to prevent the occurrence of membrane defects due to overdrying of the organic solvent, and thus it is possible to prevent performance deterioration.

The composite semipermeable membrane obtained by the above method can be further improved in solute blocking performance and water permeating performance by further adding a step of cleaning the composite semipermeable membrane with hot water in a range of 25° C. to 90° C. for 1 minute to 60 minutes.

In the modification step, a reaction with an aliphatic carboxylic acid derivative is performed on the composite semipermeable membrane obtained through the above steps. The aliphatic carboxylic acid derivative may be brought into contact with the composite semipermeable membrane as it is, or may be dissolved in a solvent that does not change the quality of the support membrane and brought into contact with the composite semipermeable membrane.

As a method of bringing the aliphatic carboxylic acid derivative into contact with the composite semipermeable membrane, a reaction may be performed by coating the separation function layer of the composite semipermeable membrane, or a reaction may be performed by immersing the membrane including the separation function layer in the aliphatic carboxylic acid derivative or a solution containing the aliphatic carboxylic acid derivative.

The reaction time and temperature at the time of coating the composite semipermeable membrane with the aliphatic carboxylic acid derivative as an aqueous solution or as it is can be appropriately adjusted depending on the type of the aliphatic carboxylic acid derivative and the coating method. When coating is performed using the aliphatic carboxylic acid derivative as an aqueous solution, the concentration of the aqueous solution is preferably 10 mmol/L to 100 mmol/L, and more preferably 100 mmol/L, from the viewpoint of the effect of improving the chlorine resistance of the separation function layer.

EXAMPLES

Hereinafter, our methods will be described with reference to Examples, but this disclosure is not limited to these Examples. Measurements in Examples and Comparative Examples were performed as follows.

Glucose Removal Ratio, Sucrose Permeability, and Isopropyl Alcohol Permeability

Evaluation was performed by comparing permeated water and feed water regarding a glucose concentration, a sucrose concentration, and an isopropyl alcohol concentration when a 1,000 mg/L glucose aqueous solution, a 1,000 mg/L sucrose aqueous solution, and a 1,000 mg/L isopropyl alcohol aqueous solution as feed water, each having a pH of 6.5 and a temperature of 25° C., individually permeated through a nanofiltration membrane at an operating pressure of 0.5 MPa.

The glucose concentration and the sucrose concentration were determined using a refractometer (RID-6A, manufactured by Shimadzu Corporation). The isopropyl alcohol concentration was determined using a gas chromatograph (GC-18A, manufactured by Shimadzu Corporation).

Glucose permeability (%)=100×(glucose concentration in permeated water/glucose concentration in feed water)

Sucrose permeability (%)=100×(sucrose concentration in permeated water/sucrose concentration in feed water)

Isopropyl alcohol permeability (%)=100×(isopropyl alcohol concentration in permeated water/isopropyl alcohol concentration in feed water)

Preparation of Rare Metal-Containing Aqueous Solution

Two aqueous solutions containing various rare metals were prepared under the following conditions.

Rare Metal-Containing Aqueous Solution A

Cobalt sulfate and nickel sulfate were mixed in equal amounts, and a 1 mol/L sulfuric acid aqueous solution and pure water were added to adjust the solution such that the pH of the final solution was 3, and a rare metal-containing aqueous solution A was obtained. Using a P-4010 type ICP (high frequency inductive coupling plasma emission spectrometry) apparatus manufactured by Hitachi, Ltd., various ion concentrations in the obtained solution were quantitatively determined. The results are as shown in Table 1.

Rare Metal-Containing Aqueous Solution B

The rare metal-containing aqueous solution A adjusted to a temperature of 25° C. was supplied at an operating pressure of 0.5 MPa, and the permeated water separated using a nanofiltration membrane G under the conditions of Example 10 below was used as the rare metal-containing aqueous solution B. Using an ICP device, various ion concentrations in the obtained solution were quantitatively determined. The results are as shown in Table 1.

Metal Ion Removal Ratio

Using an ICP (high frequency inductive coupling plasma emission spectrometry) apparatus, the metal ion removal ratio when supplying the rare metal-containing aqueous solution adjusted to a temperature of 25° C. to a semipermeable membrane at an operating pressure of 0.5 MPa was obtained according to the following equation.

Metal ion removal ratio=100×{1−(metal ion concentration in permeated water/metal ion concentration in feed water)}

Preparation of Porous Support Membrane

A 15.0 mass % dimethylformamide (DMF) solution of a polysulfone was cast on a nonwoven fabric (air permeability: 0.5 cc/cm$^2$/sec to 1 cc/cm$^2$/sec) formed of polyester fibers at room temperature (25° C.) with a thickness of 180 μm, and the nonwoven fabric was immediately immersed in pure water and allowed to stand for 5 minutes to prepare a porous support membrane (porous support layer) (thickness: 150 μm to 160 μm) formed of a fiber reinforced polysulfone support membrane. In the following, it was used to prepare a nanofiltration membrane and a reverse osmosis membrane.

Preparation of Nanofiltration Membrane A

NF-270-400 (manufactured by Dupont FilmTech) was washed with water and stored at room temperature to obtain a nanofiltration membrane A.

Preparation of Nanofiltration Membrane B

A porous support membrane was immersed in an aqueous solution containing 2.0 mass % of 4,4'-bipiperidine for 2 minutes, the support membrane was slowly pulled up in a vertical direction, nitrogen was blown from an air nozzle to remove an excess aqueous solution from the surface of the support membrane, and then an n-decane solution containing 0.5 mass % of trimesic acid chloride was applied at a proportion of 160 cm$^3$/m$^2$ such that the surface of the support membrane was completely wetted, followed by standing under an atmosphere of 25° C. for 1 minute. Next, to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration B.

Preparation of Nanofiltration Membrane C

A porous support membrane was immersed in an aqueous solution containing 2.0 mass % of piperazine for 2 minutes, the support membrane was slowly pulled up in a vertical direction, nitrogen was blown from an air nozzle to remove an excess aqueous solution from the surface of the support membrane, and then an n-decane solution containing 0.25 mass % of trimesic acid chloride was applied at a proportion of 160 cm$^3$/m$^2$ such that the surface of the support membrane was completely wetted, followed by heating under an atmosphere of 40° C. for 1 minute. Next, to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration C.

Preparation of Nanofiltration Membrane D

A porous support membrane was immersed in an aqueous solution containing 3.0 mass % of piperazine for 2 minutes, the support membrane was slowly pulled up in a vertical direction, nitrogen was blown from an air nozzle to remove an excess aqueous solution from the surface of the support membrane, and then an n-decane solution containing 0.5 mass % of trimesic acid chloride was applied at a proportion of 160 cm$^3$/m$^2$ such that the surface of the support membrane was completely wetted, followed by heating under an atmosphere of 90° C. for 1 minute. Next, to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration D.

Preparation of Nanofiltration Membrane E

A porous support membrane was immersed in an aqueous solution containing 2.5 mass % of 2-methylpiperazine for 2 minutes, the support membrane was slowly pulled up in a vertical direction, nitrogen was blown from an air nozzle to remove an excess aqueous solution from the surface of the support membrane, and then an n-decane solution containing 0.5 mass % of trimesic acid chloride was applied at a proportion of 160 cm$^3$/m$^2$ such that the surface of the support membrane was completely wetted, followed by standing under an atmosphere of 25° C. for 1 minute. Next, to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration E.

Preparation of Nanofiltration Membrane F

A porous support membrane was immersed in an aqueous solution containing 2.5 mass % of 2,5-dimethylpiperazine for 2 minutes, the support membrane was slowly pulled up in a vertical direction, nitrogen was blown from an air nozzle to remove an excess aqueous solution from the surface of the support membrane, and then an n-decane solution containing 0.1 mass % of trimesic acid chloride was applied at a proportion of 160 cm$^3$/m$^2$ such that the surface of the support membrane was completely wetted, followed by standing under an atmosphere of 25° C. for 1 minute. Next, to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration F.

Preparation of Nanofiltration Membrane G

A porous support membrane was immersed in an aqueous solution containing 2.0 mass % of 2,5-diethylpiperazine for 2 minutes, the support membrane was slowly pulled up in a vertical direction, nitrogen was blown from an air nozzle to remove an excess aqueous solution from the surface of the support membrane, and then an n-decane solution containing 0.1 mass % of trimesic acid chloride was applied at a proportion of 160 cm$^3$/m$^2$ such that the surface of the support membrane was completely wetted, followed by standing under an atmosphere of 25° C. for 1 minute. Next, to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration membrane G.

Preparation of Reverse Osmosis Membrane A

A porous support membrane was immersed for 2 minutes in an aqueous solution containing 1.5 mass % of meta-phenylenediamine and 3.0 mass % of ε-caprolactam, and the support membrane was slowly pulled up in the vertical direction, nitrogen was blown from an air nozzle to remove an excess aqueous solution from the surface of the support membrane, and then an n-decane solution containing 0.05 mass % of trimesic acid chloride was applied such that the surface was completely wetted, followed by standing for 1 minute. Next, to remove excess solution from the membrane, the membrane was vertically held for 2 minutes to perform liquid removal, and a gas of 20° C. was blown using a blower to dry the membrane. The separation membrane thus obtained was treated with an aqueous solution containing 0.7 mass % of sodium nitrite and 0.1 mass % of sulfuric acid at room temperature for 2 minutes, immediately cleaned with water, and stored at room temperature to obtain a reverse osmosis membrane A.

Preparation of Nanofiltration Membrane H

A porous support membrane was immersed for 2 minutes in an aqueous solution containing 3.0 mass % of a polyfunctional amine and F-caprolactam prepared such that a total concentration of the polyfunctional amine was 1.5 mass % and a molar ratio of meta-phenylenediamine/1,3,5-triaminobenzene=70/30, the support membrane was slowly pulled up in the vertical direction, nitrogen was blown from an air nozzle to remove an excess aqueous solution from the surface of the support membrane, and then an n-decane solution containing 0.05 mass % of trimesic acid chloride was applied such that the surface was completely wetted, followed by standing for 1 minute. Next, to remove excess solution from the membrane, the membrane was vertically held for 2 minutes to perform liquid removal, and a gas of 20° C. was blown using a blower to dry the membrane. The separation membrane thus obtained was treated with an aqueous solution containing 0.7 mass % of sodium nitrite and 0.1 mass % of sulfuric acid at room temperature for 2 minutes, immediately cleaned with water, and stored at room temperature to obtain a nanofiltration membrane H.

Preparation of Nanofiltration Membrane I

SCL-100 (manufactured by Toray Industries, Inc.) was treated with a 0.5 mass % sodium hypochlorite aqueous solution adjusted to a pH of 9 at room temperature for 24 hours, then immediately cleaned with water, and stored at room temperature to obtain a nanofiltration membrane I.

Example 1

The nanofiltration membrane A was used as the separation membrane, the rare metal-containing aqueous solution A was treated as feed water at an operating pressure of 0.75 MPa, and the ion concentration in the permeated water after 24 hours of operation was evaluated. The results are shown in Table 1 together with the glucose permeability, the sucrose permeability, and the isopropyl alcohol permeability.

Example 2

The same procedure as in Example 1 was carried out except that the nanofiltration membrane B was used as the separation membrane. The results are shown in Table 1.

Example 3

The same procedure as in Example 1 was carried out except that the nanofiltration membrane C was used as the separation membrane. The results are shown in Table 1.

Example 4

The same procedure as in Example 1 was carried out except that the nanofiltration membrane D was used as the separation membrane. The results are shown in Table 1.

Example 5

The same procedure as in Example 1 was carried out except that the nanofiltration membrane E was used as the separation membrane. The results are shown in Table 1.

Example 6

The same procedure as in Example 1 was carried out except that the nanofiltration membrane F was used as the separation membrane. The results are shown in Table 1.

Example 7

The same procedure as in Example 1 was carried out except that the nanofiltration membrane G was used as the separation membrane. The results are shown in Table 1.

Example 8

The same procedure as in Example 1 was carried out except that the nanofiltration membrane A was used as the separation membrane, and aqueous ammonia was added as a complex forming agent to the rare metal-containing aqueous solution A such that the ammonia concentration was 0.5 mass %, and the pH was adjusted to 5 using a 1 mol/L sulfuric acid aqueous solution. The results are shown in Table 1.

Example 9

The same procedure as in Example 8 was carried out except that the pH of the feed water was adjusted to 1. The results are shown in Table 1.

Example 10

The same procedure as in Example 8 was carried out except that the pH of the feed water was adjusted to 3. The results are shown in Table 1.

Example 11

The same procedure as in Example 8 was carried out except that the pH of the feed water was adjusted to 7. The results are shown in Table 1.

Example 12

The same procedure as in Example 8 was carried out except that aqueous ammonia was added as a complex forming agent to the rare metal-containing aqueous solution A, and the pH was not adjusted. The pH of the feed water in this example was 9. The results are shown in Table 1.

Example 13

The same procedure as in Example 8 was carried out except that the nanofiltration membrane F was used as the separation membrane. The results are shown in Table 1.

Example 14

The same procedure as in Example 8 was carried out except that the nanofiltration membrane G was used as the separation membrane, and ethylenediamine was added as a complex forming agent to the rare metal-containing aqueous solution A to be 0.5 mass %. The results are shown in Table 1.

Example 15

The nanofiltration membrane G was used as the separation membrane, ethylenediamine was added as a complex forming agent to the rare metal-containing aqueous solution B (permeated water obtained by separation using the nanofiltration membrane G under the conditions in Example 10) to be 0.5 mass %, the pH was adjusted to 5 using a 1 mol/L sulfuric acid aqueous solution, the obtained liquid was treated as feed water at an operating pressure of 0.75 MPa, and the ion concentration in the permeated water after 24 hours of operation was evaluated. The results are shown in Table 1.

Comparative Example 1

The same procedure as in Example 1 was carried out except that the reverse osmosis membrane A was used as the separation membrane. The results are shown in Table 2.

Comparative Example 2

The same procedure as in Example 1 was carried out except that the nanofiltration membrane H was used as the separation membrane. The results are shown in Table 2.

Comparative Example 3

The same procedure as in Example 1 was carried out except that the nanofiltration membrane I was used as the separation membrane. The results are shown in Table 2.

Comparative Example 4

The same procedure as in Example 8 was carried out except that the reverse osmosis membrane A was used as the separation membrane. The results are shown in Table 2.

Comparative Example 5

The same procedure as in Example 8 was carried out except that the nanofiltration membrane H was used as the separation membrane. The results are shown in Table 2.

Comparative Example 6

The same procedure as in Example 10 was carried out except that the nanofiltration membrane I was used as the separation membrane. The results are shown in Table 2.

As seen from the results in Tables 1 and 2, in the treatment for a rare metal-containing aqueous solution using a nanofiltration membrane, the treatment using a nanofiltration membrane, in which the glucose permeability is 3 times or more the sucrose permeability, the sucrose permeability is 10% or less, and the isopropyl alcohol permeability is 50% or more when a 1,000 mg/L glucose aqueous solution, a 1,000 mg/L sucrose aqueous solution, and a 1,000 mg/L isopropyl alcohol aqueous solution, each having a pH of 6.5 and a temperature of 25° C., are individually allowed to permeate through the membrane at an operating pressure of 0.5 MPa, is important for selectively separating nickel ions and cobalt ions with high efficiency. It is also seen that the addition of a complex forming agent further improves the selective separability and the separation and recovery efficiency.

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| A: glucose permeability (%) | | | 6.0 | 49.6 | 6.0 | 1.4 | 28.6 | 39.0 | 56.6 | 6.0 | 6.0 |
| B: sucrose permeability (%) | | | 1.8 | 9.0 | 0.80 | 0.20 | 1.3 | 2.0 | 1.5 | 1.80 | 1.80 |
| A/B | | | 3.3 | 5.5 | 7.5 | 7.0 | 22.0 | 19.5 | 37.7 | 3.3 | 3.3 |
| Isopropyl alcohol permeability (%) | | | 81.0 | 85.0 | 83.0 | 53.0 | 95.4 | 94.4 | 94.9 | 81.0 | 81.0 |
| Complex forming agent | | | No | No | No | No | No | No | No | Ammonia | Ammonia |
| Rare metal-containing aqueous solution A | Raw water pH | | 3 | 3 | 3 | 3 | 3 | 3 | 3 | 5 | 1 |
| | Metal ion concentration | mg/L | Metal ion concentration in permeated water after 24 hours of operation | | | | | | | | |
| | | | (mg/L) | (mg/L) | (mg/L) | (mg/L) | (mg/L) | (mg/L) | (mg/L) | (mg/L) | (mg/L) |
| Raw water in first separation step using nanofiltration membrane | Ni ion | 5000 | 255 | 2356 | 285 | 67 | 1359 | 1853 | 2689 | 1020 | 510 |
| | Co ion | 5000 | 116 | 1026 | 68 | 16 | 187 | 277 | 363 | 125 | 31 |
| | Ni ion/Co ion | 1.00 | 2.20 | 2.30 | 4.19 | 4.16 | 7.27 | 6.69 | 7.40 | 8.17 | 16.3 |
| Rare metal-containing aqueous solution B Raw water in second separation step using nanofiltration membrane | Ni ion | 4811 | | | | | | | | | |
| | Co ion | 370 | | | | | | | | | |
| | Ni ion/Co ion | 13.0 | | | | | | | | | |

TABLE 1-continued

|  |  | Ex. 10 | Ex. 11 | Ex. 12 | Ex. 13 | Ex. 14 | Ex. 15 |
|---|---|---|---|---|---|---|---|
| A: glucose permeability (%) | | 6.0 | 6.0 | 6.0 | 39.0 | 56.6 | 56.6 |
| B: sucrose permeability (%) | | 1.80 | 1.80 | 1.80 | 2.0 | 1.5 | 1.5 |
| A/B | | 3.3 | 3.3 | 3.3 | 19.5 | 37.7 | 37.7 |
| Isopropyl alcohol permeability (%) | | 81.0 | 81.0 | 81.0 | 94.4 | 94.9 | 94.9 |
| Complex forming agent | | Ammonia | Ammonia | Ammonia | Ammonia | Ethylene-diamine | Ethylene-diamine |
| Rare metal-containing aqueous solution A Raw water in first separation step using nanofiltration membrane | Raw water pH | 3 | 7 | 9 | 5 | 5 | 5 |
| | Metal ion concentration mg/L | colspan Metal ion concentration in permeated water after 24 hours of operation | | | | | |
| | | (mg/L) | (mg/L) | (mg/L) | (mg/L) | (mg/L) | (mg/L) |
| | Ni ion 5000 | 1000 | 1133 | 1275 | 4290 | 4811 | 4811 |
| | Co ion 5000 | 62 | 131 | 208 | 296 | 370 | 370 |
| | Ni ion/Co ion 1.00 | 16.0 | 8.63 | 6.13 | 14.5 | 13.0 | 13.0 |
| Rare metal-containing aqueous solution B Raw water in second separation step using nanofiltration membrane | Ni ion 4811 | | | | | | 4793 |
| | Co ion 370 | | | | | | 31 |
| | Ni ion/Co ion 13.0 | | | | | | 155 |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| A: glucose permeability (%) | | | 0.20 | 2.2 | 22.0 | 0.20 | 2.2 | 22.0 |
| B: sucrose permeability (%) | | | 0.10 | 1.2 | 10.0 | 0.10 | 1.2 | 10.0 |
| A/B | | | 2.0 | 1.8 | 2.2 | 2.0 | 1.8 | 2.2 |
| Isopropyl alcohol permeability (%) | | | 11.0 | 44.4 | 95.9 | 11.0 | 44.4 | 95.9 |
| Complex forming agent | | | No | No | No | Ammonia | Ammonia | Ethylene-diamine |
| Rare metal-containing aqueous solution A Raw water in first separation step using nanofiltration membrane | Metal ion concentration | mg/L | Metal ion concentration in permeated water after 24 hours of operation | | | | | |
| | | | (mg/L) | (mg/L) | (mg/L) | (mg/L) | (mg/L) | (mg/L) |
| | Ni ion | 5000 | 6.0 | 68 | 715 | 10.8 | 123 | 1430 |
| | Co ion | 5000 | 5.2 | 60 | 680 | 8.9 | 101 | 1258 |
| | Ni ion/Co ion | 1.00 | 1.14 | 1.15 | 1.05 | 1.21 | 1.21 | 1.14 |

INDUSTRIAL APPLICABILITY

Our methods can be suitably used as a method of efficiently separating and recovering cobalt and nickel present in an aqueous solution.

Although this disclosure has been described in detail with reference to specific examples, it will be apparent to those skilled in the art that various modifications and variations are possible without departing from the spirit and scope of this disclosure.

This application is based on Japanese Patent Application No. 2020-94338 filed on May 29, 2020, the subject matter of which is incorporated herein by reference.

The invention claimed is:

1. A method of separating and recovering a cobalt salt and a nickel salt, the method comprising a separation step of separating, by using a nanofiltration membrane, a cobalt salt and a nickel salt from a rare metal-containing aqueous solution containing at least both the cobalt salt and the nickel salt as rare metals,
wherein the nanofiltration membrane has a glucose permeability of 3 times or more a sucrose permeability, the sucrose permeability of 10% or less, and an isopropyl alcohol permeability of 50% or more when a 1,000 mg/L glucose aqueous solution, a 1,000 mg/L sucrose aqueous solution, and a 1,000 mg/L isopropyl alcohol aqueous solution, each having a pH of 6.5 and a temperature of 25° C., individually permeate through the nanofiltration membrane at an operating pressure of 0.5 MPa.

2. The method according to claim 1, wherein the nanofiltration membrane comprises a base material, a support membrane on the base material, and a separation function layer on the support membrane, and
the separation function layer comprises a polyamide having a structure derived from a polyfunctional aliphatic amine and a structure derived from a polyfunctional acid halide.

3. The method according to claim 2, wherein the polyfunctional aliphatic amine is a compound represented by formula (1),

provided that $R^1$ and $R^2$ each independently represent an alkyl group having 1 to 6 carbon atoms, a phenyl group, a benzyl group, $COOR^5$, $CONHR^5$, $CON(R^5)_2$, or $OR^5$, and $R^5$ represents a hydrogen atom, an alkyl group having 1 to 6 carbon atoms, a phenyl group, or a benzyl group; and $R^3$ and $R^4$ each independently represent hydrogen, an alkyl group having 1 to 6 carbon atoms, a phenyl group, a benzyl group, $COOR^6$, $CONHR^6$, $CON(R^6)_2$, or $OR^6$, and $R^6$ represents a hydrogen atom, an alkyl group having 1 to 6 carbon atoms, a phenyl group, or a benzyl group.

4. The method according to claim 2, wherein the polyamide is a crosslinked aromatic polyamide having a structure represented by formula (2),

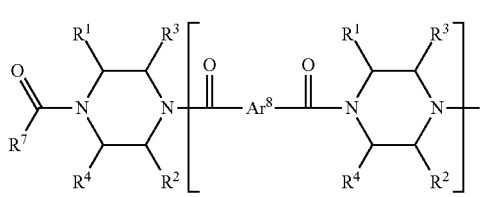

(2)

provided that $R^1$ and $R^2$ each independently represent an alkyl group having 1 to 6 carbon atoms, a phenyl group, a benzyl group, $COOR^5$, $CONHR^5$, $CON(R^5)_2$, or $OR^5$, and $R^5$ represents a hydrogen atom, an alkyl group having 1 to 6 carbon atoms, a phenyl group, or a benzyl group; $R^3$ and $R^4$ each independently represent hydrogen, an alkyl group having 1 to 6 carbon atoms, a phenyl group, a benzyl group, $COOR^6$, $CONHR^6$, $CON(R^6)_2$, or $OR^6$, and $R^6$ represents a hydrogen atom, an alkyl group having 1 to 6 carbon atoms, a phenyl group, or a benzyl group; $R^7$ is an aliphatic chain or an aliphatic ring comprising only a carbon atom and a hydrogen atom as a constituent element; and $Ar^8$ is an aromatic ring having 6 to 14 carbon atoms which may have a substituent.

5. The method according to claim 1, further comprising a complex forming step of adding a complex forming agent to the rare metal-containing aqueous solution before the separation step,
wherein the complex forming agent has a solubility in water of 100 mg/L or more.

6. The method according to claim 5, wherein the complex forming step comprises a step of adjusting a pH of the rare metal-containing aqueous solution to 1 or more and 9 or less.

7. The method according to claim 5, wherein the complex forming step comprises a step of adding an amine-based ligand as the complex forming agent.

8. The method according to claim 1, further comprising, before the separation step, an acid treatment step of bringing a material containing at least both cobalt and nickel as rare metals into contact with an acid aqueous solution to obtain the rare metal-containing aqueous solution.

9. The method according to claim 8, further comprising a mixing step of mixing a permeated water generated in a concentration step with the rare metal-containing aqueous solution obtained in the acid treatment step,
wherein, in the separation step, the permeated water and a concentrated water are obtained from a mixed water obtained in the mixing step.

10. The method according to claim 1, wherein the separation step comprises at least a first separation step and a 2a-th separation step which use the nanofiltration membrane, and
a permeated water obtained in the first separation step is treated in the 2a-th separation step.

11. The method according to claim 10, wherein the permeated water obtained in the first separation step is diluted to be treated in the 2a-th separation step.

12. The method according to claim 1, wherein the separation step comprises at least a first separation step and a 2b-th separation step which use the nanofiltration membrane, and
a non-permeated water obtained in the first separation step is treated in the 2b-th separation step.

13. The method according to claim 12, wherein the non-permeated water obtained in the first separation step is diluted to be treated in the 2b-th separation step.

14. The method according to claim 1, further comprising, before the separation step, a pre-separation step of separating an alkali metal salt and a polyvalent rare metal salt by using the nanofiltration membrane, to obtain a permeated water in which an alkali metal ion concentration (mg/L) is 100 times or more a polyvalent rare metal ion concentration (mg/L).

15. The method according to claim 1, further comprising a concentration step of concentrating an aqueous solution obtained in the separation step with a reverse osmosis membrane.

* * * * *